June 6, 1933.    H. J. KERR    1,912,901
WELDING PROCESS
Filed Feb. 10, 1928
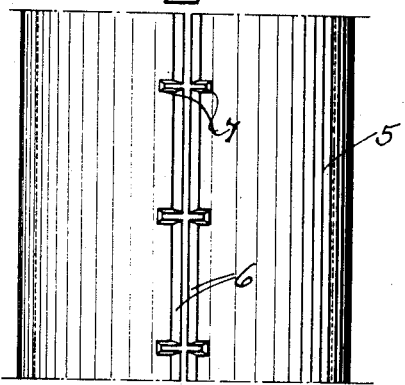
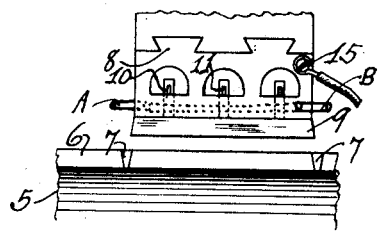
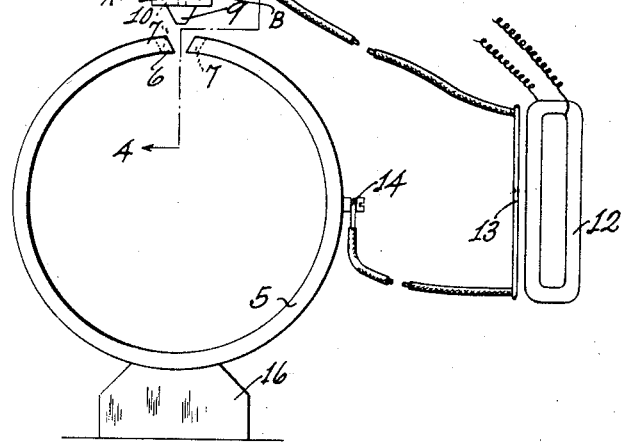
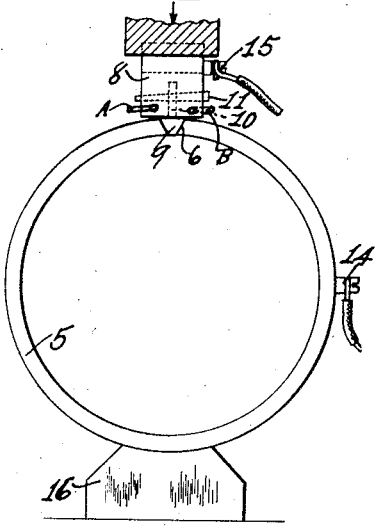
Howard J. Kerr INVENTOR
BY Gifford & Scull
ATTORNEYS Patented June 6, 1933

1,912,901

UNITED STATES PATENT OFFICE

HOWARD J. KERR, OF WESTFIELD, NEW JERSEY, ASSIGNOR TO THE BABCOCK & WILCOX COMPANY, OF BAYONNE, NEW JERSEY, A CORPORATION OF NEW JERSEY

WELDING PROCESS

Application filed February 10, 1928. Serial No. 253,268.

This invention relates to a process of welding that is especially applicable for welding a longitudinal seam for making drums with thick walls, but is not restricted to this particular use. The invention will be understood from the description in connection with the accompanying drawing in which Fig. 1 is an end view of a drum preparatory to its being welded; Fig. 2 is a similar view showing another stage of the welding process; Fig. 3 is a plan view of the drum before it is welded; and Fig. 4 is a section along the line 4—4 of Fig. 1.

In the drawing, reference character 5 indicates a sheet of metal that has been bent into circular shape to form a drum. The edges 6 of the sheet are preferably beveled so as to form a V-shaped space between the edges when they are brought into proximity to each other. Each of the edges 6 may be provided with notches 7 at intervals to diminish the longitudinal expansion of the edges during the welding operation.

The metallic head or block 8 of a press carries a strip of metal or filling piece 9 that may also be V-shaped and slightly wider than the distance between the edges 6. The strip 9 may be retained in firm engagement with the face of the block 8 by means of the pins 10 that are attached to the strip 9 and project into holes in the block 8. The pins 10 are provided with transverse slots and wedges 11 project through transverse holes in the block 8 and through the slots in the pins 10 to draw the strip 9 into firm engagement with the face of the block 8, so that there will be large area of contact between the back of the strip 9 and the face of the block 10 for the passage of the electric current.

The block 8 may be cooled by providing holes therein near the face thereof and passing a cooling fluid through the holes. For example, holes may be drilled parallel to the sides of the block 8 so as to cross each other near the corners of the block. An inlet hose A is connected to the end of one of the holes and an outlet hose B to another near an opposite corner with the ends of the other holes stopped up so that the fluid or water will pass through the holes, entering near one corner of the block and escaping near the other.

The heat for welding is produced by an electric current from any convenient source. Reference character 12 indicates the primary of a transformer that may receive current from any convenient source. A secondary 13 of the transformer has one of its terminals connected to the sheet of metal or drum 5, as indicated at 14, and its other terminal connected to the metal block 8, as indicated at 15. The drum rests upon a block or support 16.

The process is applicable to the welding of cylinders or drums, even though they may be of great length and thickness, and the operation of welding may be performed either by the well known resistance method or by the flash welding method. A short strip or filling piece 9 is attached to the block 8, preferably being of sufficient length to extend from one of the notches 7 to the next one along the edges 6. The block 8 is moved to insert the strip 9 in the gap between the edges 6 and current is caused to pass between the strip 9 and the edges 6 and heat the same. The parts are maintained in this position until the welding temperature has been reached, and the press is then caused to force the hot filling piece 9 in between the edges 6, whereupon the welding of the parts takes place. If the flash method is employed, the joint is flashed several times before applying the final welding pressure. After the weld is completed the pins 10 are cut off. The resiliency of the sheet metal 5 causes pressure to be maintained as the filling piece 9 is inserted by the press. The transverse notches 7 prevent the expansion due to the heat from expanding the edges too much. The next filling piece is then welded in place in a manner similar to that just described, and so on, until the seam is completed. The spaces between the ends of the successive filling pieces 8, which may correspond to the notches 7, may be utilized as the points at which holes are provided into which tubes may be expanded especially when the drum is used as a boiler drum or tube header. However, if a continuous welded seam is desired, the spaces and notches 7 may be closed by fusion welding in the well known manner whereby the drum is supported and if necessary the drum may be additionally supported at the sides.

I claim:

1. The process of welding which comprises making notches at spaced intervals in the edges of a sheet of metal, bending said sheet until said edges are brought into proximity to each other, inserting a strip of metal between said edges, passing an electric current through said edges and said strip, and pressing said strip into place after the desired temperature has been reached.

2. The process of welding which comprises bringing the edges of metal that are to be welded into proximity to each other, said edges being shaped to provide a V-shaped opening, inserting a strip of metal between said edges, passing an electric current through said edges and said strip, withdrawing said strip to strike an arc and pressing said strip into place after the desired temperature has been reached.

3. In welding to form a hollow steel cylindrical shell for boiler drum or the like, outwardly beveling the adjacent portions of the shell to be joined so that they present an outwardly opening notch for a welded seam, forming opposite transverse clefts extending deeply into said portions from said notch for reducing the expansion and stress producing effects of the subsequent welding of the shell, welding by the positioning of weld metal between said portions at both sides of the opening delineated by a pair of said clefts and then successively positioning weld metal separately between other adjacent pairs of clefts until the entire longitudinal seam is completed between openings at the clefts.

4. In the manufacture of hollow cylindrical steel shells for boiler drums or the like, the positioning of adjacent ends of the shell in alignment and in spaced arrangement so as to provide an opening therebetween for weld metal which is to form a longitudinal seam of the shell, the forming in the ends of opposed deep transverse clefts at a plurality of spaced positions along the seam, and the welding together of the ends by the welding and pressing into position of straight bars of weld metal between successive pairs of opposed clefts until the longitudinal seam is completed, the bars of weld metal being cut to such lengths that they correspond with the length of the faces of the ends between successive pairs of clefts.

5. In the manufacture of steel pressure vessels such as boiler drums, the formation of deep transverse clefts extending into the adjoining end portions of opposite sections to constitute parts of the vessel, and the subsequent fusing of weld metal between the clefts only so that stresses due to heating are reduced and so that openings are successively left along the longitudinal seam as the welding progresses.

6. In the manufacture of pressure vessels such as boiler drums, the positioning of curved steel sections so that their ends are in parallel and adjacent relationship to delineate a longitudinal seam weld, the formation in adjacent ends of the sections of opposite and deep transverse clefts at a plurality of spaced positions along the seam, successively welding portions of the adjoining ends of the sections by successively fusing weld metal between adjacent pairs of the opposed clefts only, continuing such welding until the adjoining parts of the sections are united throughout the length of the drum to form a longitudinal seam interrupted by openings at the opposed clefts, the formation of boiler tube seats in the openings remaining at the clefts, and the expanding of boiler tubes into said tube seats.

7. In the art of welding metallic sections of considerable length, positioning bevelled marginal portions of said sections in proximity so that they delineate a seam to be completed by the weld, the formation of opposite clefts in said portions transversely of the seam, and the welding of said sections by the interposition of weld metal exteriorly of the openings at the clefts to effect a union which is coextensive with said portions beyond the openings delineated by the clefts, the sections being maintained out of contact during the welding so that they are joined only by a body of deposited weld metal.

8. In the art of welding, successively inserting separate rigid weld strips between metallic sections to be united, spacing each strip endwise from the next preceding strip so as to leave an opening therebetween and between the sections, heating each strip simultaneously throughout its length while it is in contact with the sections, and exerting simultaneous pressure upon each strip throughout its length to complete its fusion with the sections while the strip is heated to fusing temperature.

9. In the art of welding, forming opposed notches in the adjacent marginal portions of metallic sections, and fusing weld metal between the sections at positions externally of those at which the notches were formed, the sections being maintained out of contact during the fusing and deposition of the weld metal.

10. In the art of welding, maintaining a body of weld metal against flexing while it is being inserted between metallic sections to be united, and simultaneously heating the body uniformly throughout its effective length and pressing it against the sections, the pressure being exerted uniformly throughout the extent of the body in contact with the sections, and the heating being done electrically with the body of weld metal constituting one of the terminals of the electrical connections.

HOWARD J. KERR.